United States Patent [19]
DiCroce

[11] Patent Number: 5,828,316
[45] Date of Patent: Oct. 27, 1998

[54] KEYLESS ENTRY FUNCTION EXPANDER

[75] Inventor: John DiCroce, Oceanside, N.Y.

[73] Assignee: Audiovox Corporation, Hauppauge, N.Y.

[21] Appl. No.: 440,106

[22] Filed: May 12, 1995

[51] Int. Cl.[6] .................................................. B60R 25/00
[52] U.S. Cl. ............................... 340/825.69; 340/825.31; 340/661; 340/428; 307/10.2; 180/287; 70/257
[58] Field of Search ........................ 340/825.04, 825.31, 340/825.34, 825.69, 825.72, 534, 660–663, 825.36, 426, 428, 533–539; 375/340; 307/9.1, 10.1–10.3; 180/287; 70/256, 257; 1/1

[56] References Cited

U.S. PATENT DOCUMENTS

| | | | |
|---|---|---|---|
| 4,788,542 | 11/1988 | Tanabe | 340/825.69 X |
| 5,345,607 | 9/1994 | Liman et al. | 455/186.1 |
| 5,469,151 | 11/1995 | Lavelle et al. | 340/825.36 |
| 5,543,776 | 8/1996 | L'Esperance et al. | 340/426 |

OTHER PUBLICATIONS

Operating Instructions for AMX 8 remote controlled vehicle security system by Prime Security, 1993.
"Keyless Entry Upgrade and Stand Alone Vehicle Security System," Code Alarm, Inc., Aug. 1994.

*Primary Examiner*—Brian Zimmerman
*Assistant Examiner*—William H. Wilson, Jr.
*Attorney, Agent, or Firm*—Graham & James LLP

[57] ABSTRACT

An add-on, or after-market, remote-control vehicle security system expander allows auxiliary remote-control functions to be added to previously-installed remote-control systems. Using complementary remote control functions for multiple actuation encoding permits auxiliary function codes to be transmitted without a change of state in the underlying function. Signal validation by coincidence timing and voltage comparison are used to prevent inadvertent local actuation of the auxiliary remote-control functions. Decoding is also limited to a time-window to reduce electrical interference.

14 Claims, 3 Drawing Sheets

KEYLESS ENTRY FUNCTION EXPANDER

BACKGROUND OF THE INVENTION

1. Field of the Invention

The present invention is relates to keyless entry vehicle security systems. In particular, the present invention relates to expander modules that can be added to those systems to increase the operational options available to the user.

2. Background of the Invention

Remote control vehicle security systems have become a standard, factory-installed feature of present day automobiles. The typical factory-installed unit has a two or three button remote control that provides certain predetermined functions, usually door lock, door unlock, and trunk release. An owner who wishes to add remote starting or window control options must replace the factory-installed unit with an after-market unit that includes those extra options with the basic three provided by the factory installed unit. Thus the consumer is stuck with the cost of a second installation, as well as a product that duplicates the functions of the factory-installed unit that must be replaced.

Some after-market units are available that add as many as two additional functions to the basic, factory-installed three-function units. However, the units presently available merely piggyback an additional response onto the responses of the factory-installed system. Therefore, it is impossible to obtain the added, optional function independent of the underlying function of the factory-installed system. In these systems merely pressing the lock/unlock switch on the car door can have unintended consequences that are undesirable, and potentially dangerous.

In vehicles that have these add-on systems a child playing with that door lock switch could not only lock the door but start the engine, exposing the child to carbon monoxide fumes. Even an adult driver would be caught off guard if, while the driver is waving goodby and pressing the door lock/unlock switch on the car door, the driver's-side window suddenly rolls up!

SUMMARY OF THE INVENTION

A vehicle security system expander in accordance with the present invention comprises a detector for detecting a control output from security system control module and an identifier for determining when the output of that system control module is produced by operation of the remote control unit. Also there is a supplemental control unit which provides a given auxiliary function when the output detected by the system control module is produced by actuation of the remote control unit.

In one embodiment the origin of the output is determined by comparing the voltages of a remote control output signal of said security system control module to the voltage of the output signal of a local control switch.

In another embodiment, the origin of the output is determined by comparing the timing of the output signal of said security system control module to the timing of the output signal of a local control switch.

In a preferred embodiment the invention further includes a timer for measuring a predetermined time period in response to receipt of a remote control signal and a detector for detecting signals within said time period.

BRIEF DESCRIPTION OF THE DRAWINGS

The present invention will be better understood when the detailed description of preferred embodiments provided below is considered in conjunction with the drawings, wherein.

In these drawings, similar items have been assigned similar reference numerals.

DETAILED DESCRIPTION OF PREFERRED EMBODIMENTS

Figure 1:
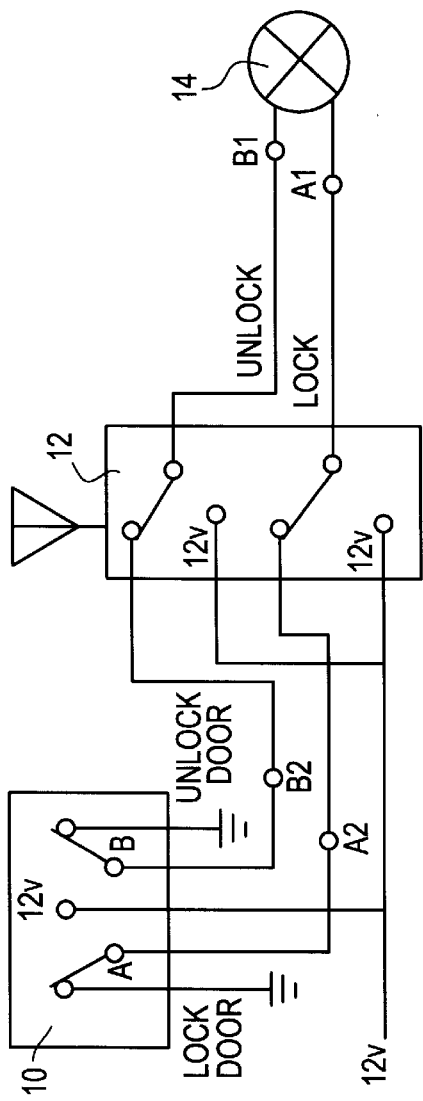
FIG. 1 shows a two-wire basic remote control module in accordance with the prior art.

FIG. 1 shows an electro-mechanical rocker-type switch 10 that cooperates with a factory-installed remote-control receiver 12 to control the actuator 14, which is a solenoid, vacuum switch or stepper motor that operates the door lock on the driver's side of the vehicle. The installation of such two-wire control circuits is preferable for safety reasons, but often more costly than single-wire circuits.

Pressing down on side "A" of the rocker switch causes the contact on side "A" to remain grounded but causes the contact on side "B" to connect the lock actuator to the 12-volt dc supply. This opens the lock on the driver's door. Pressing down on side "B" of the rocker switch causes the contact on side "A" to connect the lock actuator 14 to the 12-volt supply line in the opposite direction, reversing the movement provided by the actuator. This re-locks the driver's door.

Alternatively, an rf remote-control signal received by the basic remote control receiver module 12 that is commonly installed as standard equipment, will produce a pulse on either the "open" or the "lock" output on this receiver module 12. Thus these "open" and "lock" output connect respective sides of the door lock actuator 14 to the 12-volt supply line, without actuating the rocker switch 10. Commonly, the remote control transmitter has a respective "lock" and "unlock" button. Some units also have an additional button for lights or trunk release.

Figure 2:
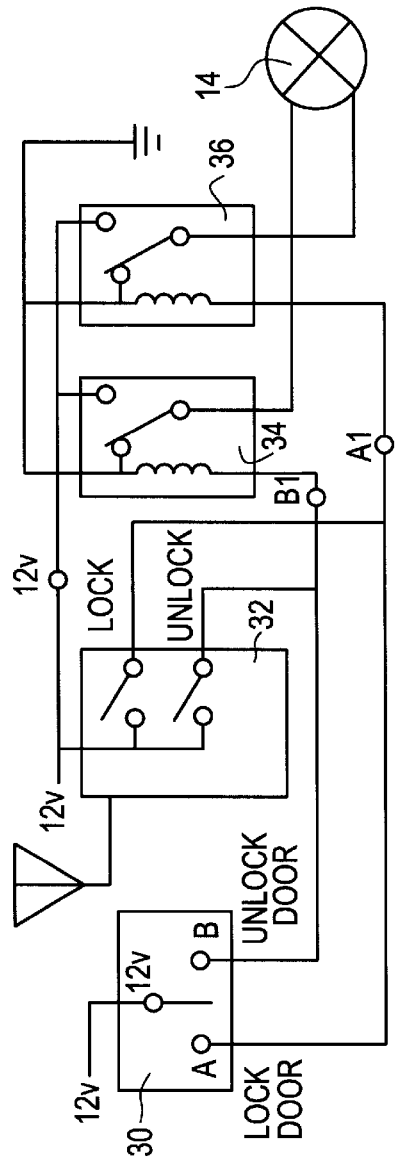
FIG. 2 shows a single-wire basic remote control module in accordance with the prior art.

FIG. 2 shows a single-wire electro-mechanical rocker switch 30 and basic remote-control receiver module 32 that control the lock actuator 14. Here, a single moveable contact floats at a 12-volt potential until pressed into contact with side "A" or side "B" to open or lock the driver's side door lock by connecting a respective out-board relay 34, 36 to the 12-volt dc line, which in turn connects the door lock actuator 14 to the 12-volt supply line. The out-board relays 34, 36 can also be selectively connected to the 12-volt supply by the receiver module 32. This circuit may be preferred for its ease of installation, noted above.

Function expanders are add-on units that upgrade the operation of these basic modules 12, 32, by responding to multiple actuations of the rf remote-control transmitter that operates the basic receiver module 12. That multiple actuation simply results in a multiplication of the pulses output by the reciever.

In the circuits shown in FIGS. 1 and 2, however, a pulsed output can be produced by actuation of their rocker switches 10, 30, as well as by an output from the receiver modules 12, 32. Thus, inadvertent re-actuation of, or contact bounce in, these rocker switches 10, 30 will produce pulses that can be mistakenly decoded as an auxiliary function command by the microprocessors that monitor those outputs.

Figure 3:
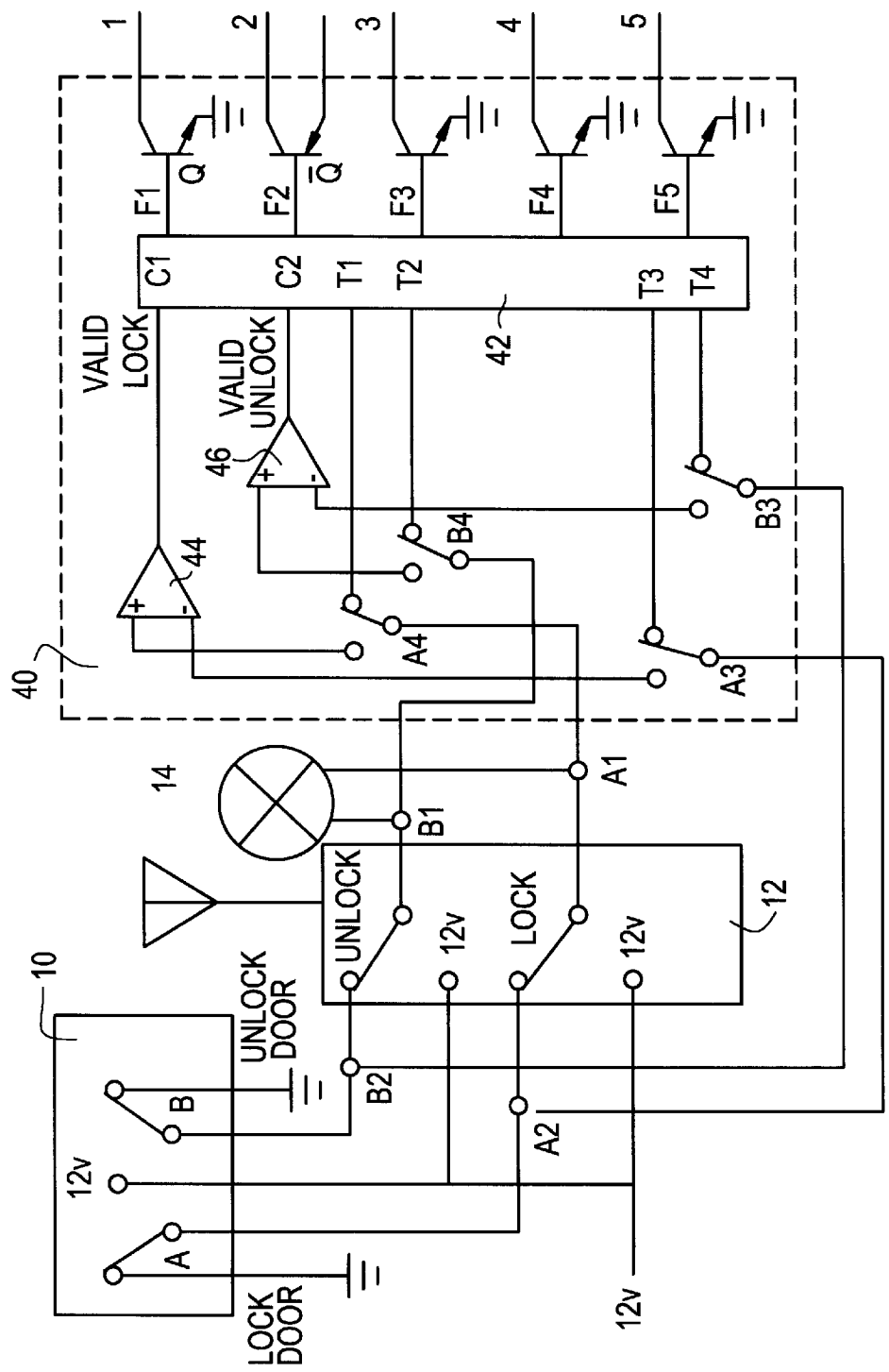
FIG. 3 shows an expander unit in accordance with the present invention for the module shown in FIG. 1.

FIG. 3 shows a function expander 40 in accordance with the present invention installed as an add-on to the two-wire remote-control module shown in FIG. 1. The microprocessor 42 of this expander 40 is installed on the remote-control receiver module 12 of FIG. 1 in parallel with actuator 14.

This expander 40 detects the origin of the first pulse appearing on either the "lock" or "unlock" input to the microprocessor, to eliminate local triggering of the auxilliary functions. In the quiescent state, switches A3, A4 and B3, B4 of the expander are set so as to select either comparator inputs C1 and C2 or timing inputs T1, T2, T3 and T4, respectively. These switches may be on-board dual in-line package (DIP) switches accessible on the expander unit 40, as shown, or software-selectable switches internal to the processor 42.

In FIG. 3, if the remote control unit produces a 12 V logic high at A1 or B1, a logic high appears on processor input C1 or C2, respectively. If a contact in switch 10 produces a 12 V high on A3 or B3 that signal also propagates from the switch 10 to A1 or B1 across a voltage drop in the receiver 12 such that A1 or B1 are reduced below the voltage level appearing at A3 or B3, respectively. Similarly, if the pulse originated in the local door switch 10, the pulse that appears at A1 or B1 will also lag A3 or B3 by an interval reflecting the gate delay inside the receiver 12. These relationships in some vehicles may be reversed: the impedance losses and lags in the wiring being greater than those encountered across the receiver 12, or the relative lag, or the voltage drop being too small to be reliably detected. Therefore, to assure reliable operation of this verification circuit in after-market expanders that are intended for use in a wide variety of vehicles, the settings of switches A3, A4, B3 and B4 and also the relative levels detected by the comparators 44, 46 are preferably software-selectable.

Auxilliary functions are initiated by toggling between logic levels, or by a trigger pulse having a software-selectable duration. Conventionally, function initiation requires a 800 milliampere ground pulse between 800 milliseconds and 8 seconds in duration, or toggling a 800 milliampere current between logic states. These paramters of the signals appearing at function outputs F1–F5 on the expander 40 are software-selectable, and the outputs are all current-limited to protect the microprocessor.

The combination of multiple pulses detected by the processor 42 on the two outputs of this receiver module 12 are treated as digitally-encoded commands for initiating five additional auxilliary functions. The processor 42 is connected in parallel with the actuator 14, to monitor those pulsed outputs on the "lock" and "unlock" outputs and decode them.

To prevent false signals produced by electrical interference from affecting the microprocessor, the microprocessor only responds to codes it receives within a finite time window following the first verified pulse. The window is opened by the first input received from either the lock or the unlock terminal of the receiver.

Any complementary functions that the basic receiver controls by providing pulses on respective separate output terminals in response to respective additional buttons on the transmitter, can also be used to provide auxilliary function codes in accordance with the present invention. Such codes are particularly advantageous in that they can be implemented without necessarily changing the status of the underlying basic function provided by the respective additional buttons on the remote control transmitter.

Figure 4A:
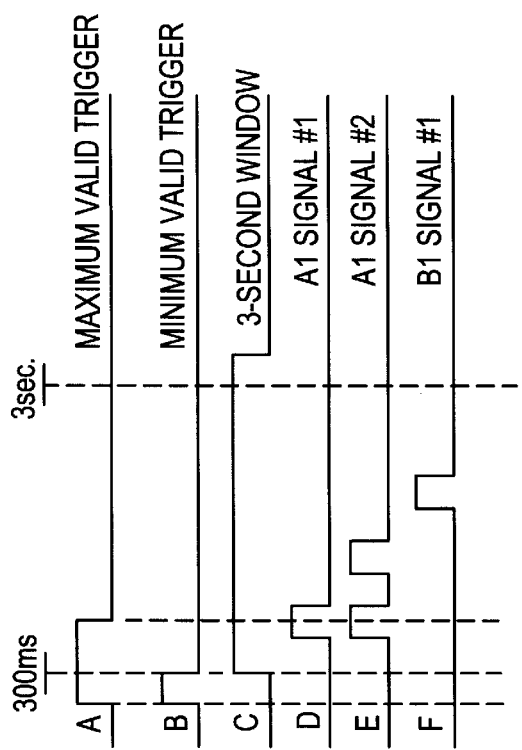
FIGS. 4a and 4b are timing diagrams showing signals used to provide auxiliary functions in accordance with the present invention.

FIG. 4a shows a standard 800 millisecond door-lock output pulse in trace A that can be used to open the three-second window. A much shorter, 300 millisecond door-lock output pulse, shown in trace B, will also open the three-second window, as shown in trace C.

In either case, once the three-second window is open, verified combinations of door-lock and door-unlock pulses that are received within that three-second time window will initiate respective auxilliary functions. For example, the door-lock output alone can easily provide both auxilliary functions #1 and #2, as shown for voltage-verified expander apparatus in traces D and E. These pulses appearing at A1 are compared to the voltage level at A3 for verification.

The door-unlock pulse shown in trace F could produce any one of three different functions, depending on whether it appeared in the three-second window alone or in combination with either trace D or trace E.

In these traces, the pulses in the auxilliary function codes are all verified. In accordance with one preferred embodiment of the present invention, all unverfied pulses would be disregarded. At least the first pulse received by the processor 42 should be verified, to eliminate most instances where the auxilliary decode window might be opened by a locally-originated pulse rather than a pulse originated by the remote-control transmitter.

Figure 4B:
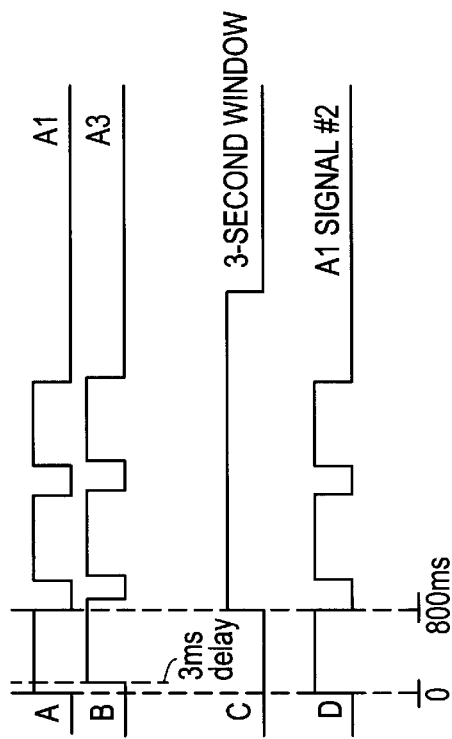

FIG. 4b shows a standard 800 millisecond door-lock pulse appearing at A1 that provides a timing-verified doorlock pulse for auxiliary function #1. The three-second window for decoding remote-control functions opens after the coincidence-timing of the first pulse received is verified by detecting a slight lag in the appearance of this pulse at point A3 in the circuit.

Figure 5:
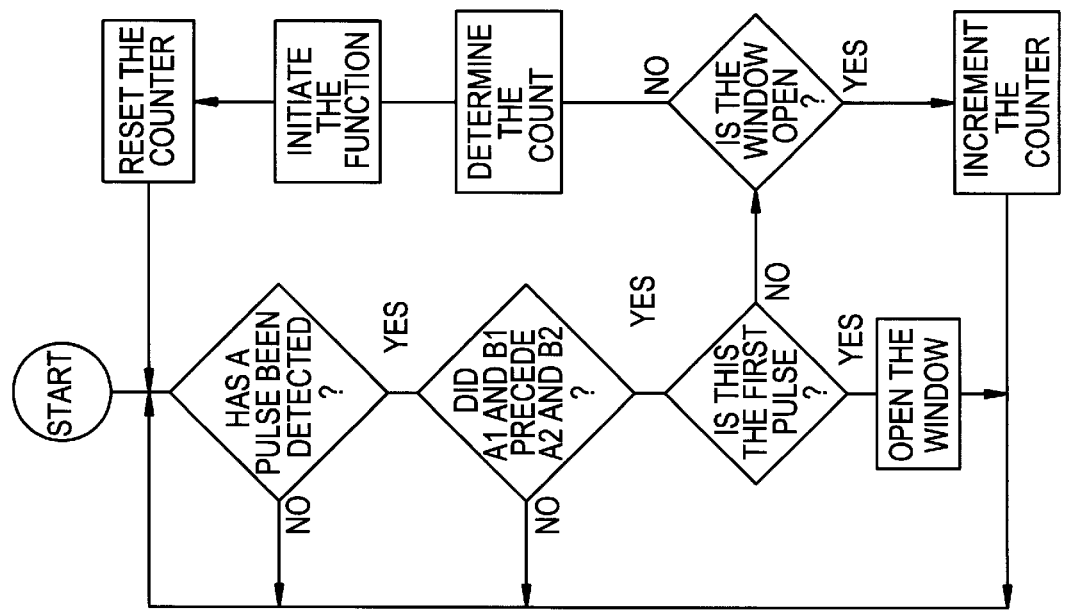
FIG. 5 is a flow chart of a control sequence for auxiliary functions in accordance with the present invention.

FIG. 5 shows the logical flow of the auxiliary function decoding process. The system shown in FIG. 5 uses coincidence timing to validate the auxiliary function signal.

The invention has been described with particular reference to the presently-preferred embodiments of the invention. It will be apparent to one skilled in the art that modifications and variations are possible within the spirit and scope of this invention. For instance, the invention may be implemented by installing the expander on the prior art remote door-lock circuit shown in FIG. 2, where voltage verification relative to the 12 V source timing verification. The invention is defined by the appended claims.

I claim:

1. A vehicle security system expander for use with a security system having a first output function that is actuated in response to a signal produced by one of an actuation of a remote control module and an actuation of a local control module, said expander comprising:

a detector for detecting an output signal produced by each of said remote control module and said local control module;

a signal origin identifier for determining if said output signal is produced by actuation of said remote control module or by actuation of said local control module; and a signal decoder for decoding signals produced by multiple actuations of said remote control module and providing a second function when said multiple actuations of said remote control module are received within a predetermined time period after said output signal is produced.

2. The expander of claim 1, wherein said signal origin identifier includes a voltage comparison device for comparing a voltage of said output signal received from said local control module with a voltage of said output signal received via said remote control module.

3. The expander of claim 1, wherein said signal origin identifier includes a timing comparison device for comparing the coincidence timing of said output signal received from said local control module with said output signal received via said remote control module.

4. The expander of claim 1, wherein first and second actuations of the remote control module produces a first signal and a second signal, said first and second signals actuating respective first and second functions, said expander further including:

a timer for opening a predetermined time window in response to said first signal being produced by an actuation of said remote control module; and a signal decoder for decoding a combination of the first and second signals produced by multiple actuations of the remote control module within said time window and produced subsequent to said output signal that opened said time window.

5. The expander of claim 4, wherein said first and second signals actuate complementary functions so that multiple actuations of said remote control module that produce only one of said first and second signals permits a second function to be provided without changing the state of said first function.

6. A vehicle security system expander for use with a security system having a door lock and a door unlock function that is actuated in response to respective lock and unlock signals produced by one of an actuation of a remote control module and an actuation of a local control module, said expander comprising:

a signal detector for detecting a signal produced by each of said remote control module and said local control module;

a signal identifier for determining if said output signal is produced by actuation of said remote control module or by actuation of said local control module; and a signal decoder for decoding combinations of the door lock and door unlock signals produced by multiple actuations of said remote control module which are detected within a predetermined time window and providing respective predetermined functions in response to said combinations.

7. A vehicle security system expander comprising:

a local control module for locally controlling unlocking and locking of vehicle doors;

a remote control module for remotely controlling unlocking and locking of vehicle doors;

a main control unit electrically connected to said local control module and said remote control module;

a remote control signal receiver electrically connected to said local control module, said main control unit adapted to receive remote control signals from said remote control module; wherein said local control module is directly connected to said main control unit at a first connection and is connected to said main control unit via said remote control signal receiver at a second connection such that a local control signal output from said local control module is received at said main control unit via said first connection and said second connection.

8. The vehicle security system of claim 7, wherein said main control unit includes a voltage detector for detecting a difference in voltage between a signal received via said first connection and a signal received via said second connection for differentiating said local control signal from said remote control signal.

9. The vehicle security system of claim 7, wherein said main control unit includes a signal timing detector for detecting a difference between a receipt time of a signal received via said first connection and a signal received via said second connection for differentiating said local control signal from said remote control signal.

10. A vehicle security system expander having a first output function and being actuated in response to a signal produced by one of an actuation of a remote control module and an actuation of a local control module, said expander comprising:

an identifier for determining if said output signal is produced by actuation of said remote control module or by actuation of said local control module;

a verifying device for verifying said output signal if said output signal is produced by actuation of said remote control module; and a control unit for responding to a signal verified by said verifying device to produce said first output function.

11. The expander of claim 10, wherein said verified signal received by said control unit is a first signal, said control unit including a timer for beginning a timing operation in response to receiving said first signal, said control unit providing a second function in response to receiving a second output signal which has been verified by said verifying device.

12. The expander of claim 10, wherein said control unit is adapted to disregard all signals which have been verified by said verifying device.

13. The expander of claim 10, wherein said signal origin identifier includes a voltage comparison device for comparing a voltage of said output signal received from said remote control module with said output signal received from said local control module.

14. The expander of claim 10, wherein said signal origin identifier includes a timing comparison device for comparing the coincidence timing of said signal received from said remote control module with said output signal received from said local control module.

* * * * *